(12) United States Patent
Lee et al.

(10) Patent No.: US 6,710,889 B2
(45) Date of Patent: Mar. 23, 2004

(54) METHOD FOR IMPROVED DIELECTRIC LAYER METROLOGY CALIBRATION

(75) Inventors: Pey-Yuan Lee, Tainan (TW); Chi-Shen Lo, Tainan (TW); Sian-Ren Horng, Tainan (TW); Han-Liang Tseng, Tainan (TW); Wei-Ming You, Taipei (TW); Yi-Hung Chen, Kaohsiung (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 10/189,052

(22) Filed: Jul. 2, 2002

(65) Prior Publication Data

US 2004/0004730 A1 Jan. 8, 2004

(51) Int. Cl.$^7$ .............................................. G01B 11/06
(52) U.S. Cl. ......................................... 356/630; 438/16
(58) Field of Search ................... 356/630, 237.4–237.6, 356/237.1, 237.2, 237.3; 250/256, 559.27, 559.19; 451/28, 41, 228; 216/21, 55, 60, 79; 438/14–16, 9

(56) References Cited

U.S. PATENT DOCUMENTS

| | | | | |
|---|---|---|---|---|
| 5,529,638 A | * | 6/1996 | Lutz | 134/6 |
| 5,851,842 A | * | 12/1998 | Katsumata et al. | 438/9 |
| 6,146,541 A | * | 11/2000 | Goldstein et al. | 216/2 |
| 6,303,397 B1 | * | 10/2001 | Chen et al. | 438/14 |
| 6,319,093 B1 | * | 11/2001 | Lebel et al. | 451/6 |
| 6,352,467 B1 | * | 3/2002 | Somekh et al. | 451/28 |
| 6,484,064 B1 | * | 11/2002 | Campbell | 700/100 |

* cited by examiner

Primary Examiner—Frank G. Font
Assistant Examiner—Sang H. Nguyen
(74) Attorney, Agent, or Firm—Tung & Associates

(57) ABSTRACT

A method for measuring a dielectric layer thickness calibration reference standard including providing a substrate having a dielectric layer for calibrating a dielectric layer thickness measuring tool; cleaning the dielectric layer according to a cleaning process including at least one of spraying and scrubbing; and, measuring the thickness of the dielectric layer with the dielectric layer thickness measuring tool including at least one portion of the dielectric layer displaced from the substrate center.

20 Claims, 2 Drawing Sheets

METHOD FOR IMPROVED DIELECTRIC LAYER METROLOGY CALIBRATION

FIELD OF THE INVENTION

This invention generally relates to chemical mechanical polishing (CMP) and more particularly to a method for maintaining and measuring a dielectric layer thickness wafer reference standard for improved metrology calibration.

BACKGROUND OF THE INVENTION

In semiconductor fabrication integrated circuits and semiconducting devices are formed by sequentially forming features in sequential layers of material in a bottom-up manufacturing method. The manufacturing process utilizes a wide variety of techniques to form the various layered features including various deposition techniques and thermal growth techniques. For example, in the manufacture of a metal oxide semiconductor (MOS) device, a thin dielectric layer, is formed on a surface of the semiconductor substrate. The dielectric layer is for example, silicon dioxide or silicon nitride, which is typically used as a gate dielectric for the MOS device. To assure proper functioning of the device, quality control measures are carried out to insure the thickness of the dielectric layer is within a specified range.

One problem associated with thin dielectric layers is that upon exposure of the dielectric layer, to an ambient environment, a contamination layer including for example, contamination and/or an oxide layer, is formed and grows over time on the dielectric layer at a given rate depending on, for example, the humidity level and contamination level in the ambient environment. Various approaches have been proposed to control the growth of the dielectric layer or to accurately predict its growth rate. A recurring problem in all these approaches however is the need for precision and accuracy in the dielectric layer thickness metrology tool. For example, if the accuracy of the metrology tool cannot be relied upon to a high degree, the occurrence of layer growth cannot be reliably determined.

For example, optical metrology tools are frequently used for determining dielectric layer thickness where various components of reflected light are analyzed to determine a dielectric layer thickness. For example, optical measurement devices, including a Beam Profile Reflectometer (BPR), a Beam Profile Ellipsometer (BPE), and a Broadband Reflective Spectrometer (BRS) are examples of optical metrology tools. Each of these devices measures parameters of optical beams reflected by, or transmitted through, the target sample.

The accuracy of dielectric layer thickness measurements depends on calibration of the metrology tool by providing a reference sample having a known substrate including a thin dielectric layer of known composition and thickness. For example, the metrology tool is periodically used to measure the reference sample and appropriately calibrated based on the known thickness of the reference sample. Typically a reference sample includes a "native oxide" reference sample, which is a silicon substrate with a silicon dioxide layer formed thereon having a thickness of about 20 Angstroms or less. The reference sample is stored in a controlled ambient environment to minimize oxide layer growth and contamination. In many cases, for example, with an Ellipsometer, industry measurement standards require several calibration measurements a day to account for oxide growth or contamination on the reference sample. The instability of the reference sample results in the frequent change of reference samples requiring more time consuming recalibration and presents serious quality control problems in device performance.

In the prior art, where dielectric layers included dimensions of, for example, greater than 50 Angstroms, a moderate amount of oxide growth and contamination was tolerable since the accuracy of the calibration was still within acceptable limits. However, the requirement for accurate measurements of dielectric layers less than about 20 Angstroms has required a higher degree of dielectric thickness measurement accuracy and consequently more exacting calibration requirements. For example, newer optical metrology tools can measure dielectric layers on the order of 10 Angstroms, requiring a high degree of stability in the reference sample for acceptable calibration.

Another problem with prior art methods using reference samples for calibration is that thickness measurements vary outside the limits of acceptable accuracy between different thickness metrology tools. For example, one metrology tool used for one manufacturing process using a particular reference sample frequently gives different results on another metrology tool making it difficult to determine which metrology tool is off calibration and whether the discrepancy is due to the reference sample or other factors attributable to the metrology tools.

For example, referring to FIG. 1 is shown a graph 10 of an exemplary series of daily measurements over time of a wafer calibration reference standard with a starting silicon dioxide layer thickness of about 20 Angstroms. The vertical axis is the silicon dioxide layer thickness in Angstroms, while the horizontal axis is time in days. Line 12A represents oxide layer thickness spot measurements taken over time at the same central portion of the reference wafer (e.g., position 0, 0) together with regression line fit 12B while line 14A represents oxide layer thickness spot measurements taken over time at the same off-center (displaced from center) portion of the reference wafer (e.g., position 0, 47) together with regression line fit 14B. The measurements were made with a Rudolph SL-200 ellipsometer with a spot size of about 7×12 microns. No pre-measurement cleaning of the calibration reference standard was performed consistent with prior art calibration methods. The results are exemplary measurements demonstrating that the entire surface of the calibration reference standard including the silicon dioxide layer has a similar oxide and/or contamination growth rate.

The trend in dielectric layer (e.g., silicon dioxide) thickness growth of the calibration reference standard presents a serious problem in quality control monitoring for semiconductor processing technologies including for example, 0.13 micron features and below, and gate oxide thicknesses on the order of 15 to 20 Angstroms. Inaccurate dielectric layer thickness measurements can result in unnecessary changes in production line processes and unnecessary scraping of production batches.

Therefore, there is a need in the semiconductor art to develop a method for achieving reliable metrology tool calibration for measuring dielectric layer thicknesses including calibration reference standards in order to accurately measure thin dielectric layer thicknesses and achieve calibration consistency between different metrology tools.

It is therefore an object of the invention to provide a method for achieving reliable metrology tool calibration for measuring dielectric layer thicknesses including calibration reference standards in order to accurately measure thin dielectric layer thicknesses and achieve calibration consistency between different metrology tools while overcoming other shortcomings and deficiencies in the prior art.

SUMMARY OF THE INVENTION

To achieve the foregoing and other objects, and in accordance with the purposes of the present invention, as embodied and broadly described herein, the present invention provides a method for measuring a dielectric layer thickness calibration reference standard.

In a first embodiment, the method includes providing a substrate having a dielectric layer for calibrating a dielectric layer thickness measuring tool; cleaning the dielectric layer according to a cleaning process including at least one of spraying and scrubbing; and, measuring the thickness of the dielectric layer with the dielectric layer thickness measuring tool including at least one portion of the dielectric layer displaced from the substrate center.

These and other embodiments, aspects and features of the invention will be better understood from a detailed description of the preferred embodiments of the invention which are further described below in conjunction with the accompanying Figures.

DETAILED DESCRIPTION OF THE PREFERRED EMBODIMENTS

Although the present invention is explained with respect to the use of an silicon dioxide layer semiconductor wafer reference standard with respect to an ellipsometer optical metrology tool, it will be appreciated that the method of the present invention may be advantageously adapted to a thickness measurement of other dielectric layers and other dielectric layer thickness layer measurement metrology tools relying on spot size measurements taken over a limited surface area of the wafer surface, for example, other optical thickness metrology tools including a Beam Profile Reflectometer (BPR) and a Broadband Reflective Spectrometer (BRS).

In one embodiment of the present invention, a semiconductor wafer reference standard is provided with a dielectric layer for a dielectric layer thickness reference measurement for calibrating the metrology tool. The wafer reference standard is subjected to a cleaning process to remove at least one of a contamination layer and an oxide layer prior to the calibration measurement. Preferably, the cleaning process includes at least one of a spraying process and a scrubbing process. A spot measurement including at least one portion of the dielectric layer is then made where the at least one portion is displaced from the wafer reference standard center. Preferably the measurement is made in a measurement area displaced at least by about 2 mm from the wafer (substrate) reference standard center, more preferably at least about 3 mm. Preferably, the calibration measurements are sequentially repeated over time, for example daily, the calibration measurements sequentially made at the same measurement area. Preferably, the reference standard is stored in a controlled environment between calibration measurements to prevent at least one of volatile organic contamination and oxide growth.

Figure 2:
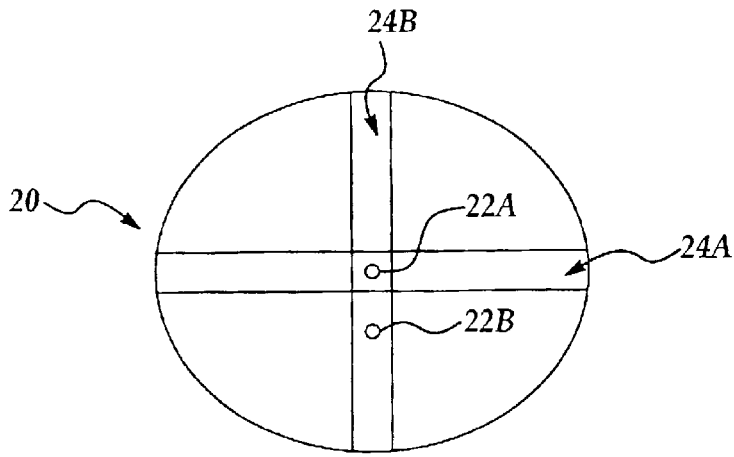
FIG. 2 is a top view of an exemplary wafer reference standard including a surface oxide layer showing exemplary measurement areas according to the measurement protocol included in one embodiment of the present invention.

For example, referring to FIG. 2 is shown a top view of an exemplary semiconductor wafer reference standard 20 having, for example, a silicon dioxide (oxide) layer formed over the surface with an initial thickness of about 20 Angstroms. Spot areas, e.g., 22A (wafer center) and 22B (displaced from wafer center) schematically represent spot measurement areas for taking dielectric layer thickness measurements over time to monitor a change in the dielectric layer thickness. It is preferable to take the spot measurements over time at the same spot measurement position in order to monitor relative changes in the dielectric layer thickness and eliminate changes due to surface irregularities. Defined areas 24A, e.g., x-axis and 24B, e.g., y-axis represent areas over which a sequential series of measurements are taken over the wafer reference standard surface to account for the uniformity of thickness measurements across the wafer.

Figure 1:
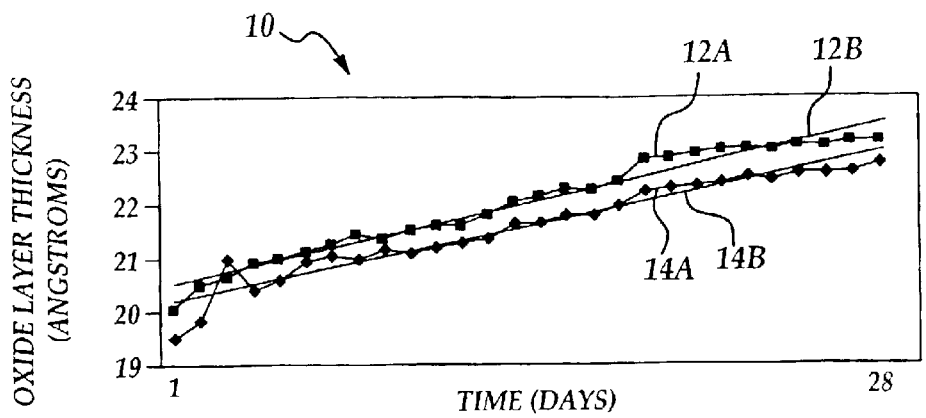
FIG. 1 is a graph of ellipsometer thickness measurements of a silicon dioxide layer calibration reference standard including a calibration measurement protocol according to the prior art.
Figure 3:
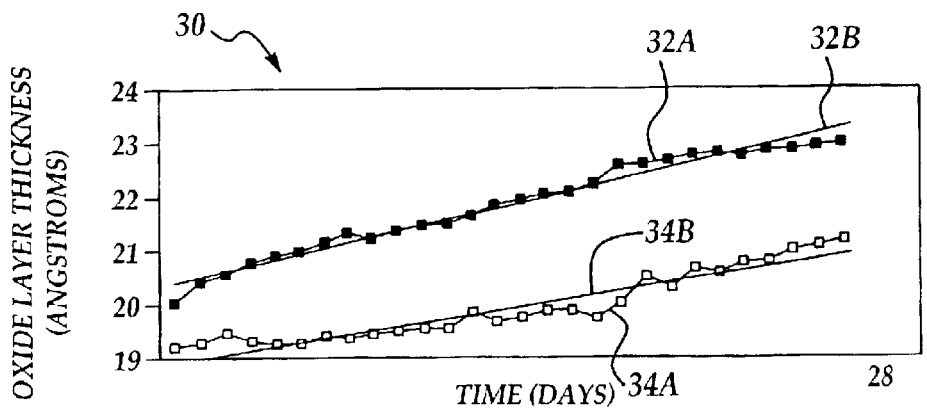
FIG. 3 is a graph of ellipsometer thickness measurements of a silicon dioxide layer calibration reference standard including a calibration measurement protocol according to one aspect of the present invention.

Referring to FIG. 3 is shown a graph 30 of an exemplary series of daily measurements over time of a wafer calibration reference standard with a starting silicon dioxide layer (dielectric oxide layer) thickness of about 20 Angstroms. The vertical axis is the silicon dioxide layer thickness in Angstroms, while the horizontal axis is time between measurements in days. Line 32A represents spot measurements taken at the same central portion of the reference wafer (e.g., 22A in FIG. 2) together with regression line fit 32B while line 34A together with regression line fit 34B also represents spot measurements taken at the central portion of the wafer following a pre-measurement cleaning process including a high pressure deionized water spray followed by a scrubbing cleaning process. The measurements were made with a Rudolph SL-200 ellipsometer with a spot size of about 7×12 microns. The calibration reference standard was stored in a controlled ambient environment between measurements and a high purity (e.g., greater than 99.99%) nitrogen purged atmosphere to control the humidity, oxygen containing gas level and organic contamination level. The results indicate that the apparent rate of the dielectric oxide layer growth is slightly reduced and the apparent overall dielectric oxide layer growth is reduced compared to the results where no pre-measurement cleaning process is performed consistent with prior art calibration protocol (see FIG. 1).

The pre-measurement cleaning process according to one aspect of the present invention includes at least one of a spraying, megasonic, and scrubbing process, preferably including at least both a spraying and scrubbing process. Preferably, the spraying process includes a pressurized deionized water jet to spray the surface of the wafer reference standard including a scrubbing cleaning process.

Preferably, the wafer reference standard is subjected to a spin dry process following a scrubbing cleaning process. In exemplary operation, the wafer reference standard is loaded into a wet environment, usually de-ionized water, and then transported through a series of cleaning chambers for a brush cleaning cycle.

For example, in exemplary operation, during the brush cleaning cycle, the process wafer is rotated at high speed, for example, about 1500 rpm, while a jet of deionized water is sprayed on the process wafer and the process wafer surface is brushed with a foam brush to dislodge contamination. The brush is first placed over the center of the wafer to contact, for example, both the front and/or backside of the wafer and moves at a constant height and pressure to the periphery of the wafer in one stroke. The brush then retracts from the wafer and the brushing cycle is repeated. Additional chambers may be provided to brush other portions of the wafer. After the brushing cycles, the wafer is deposited in the spin dry chamber for drying.

Figure 4:
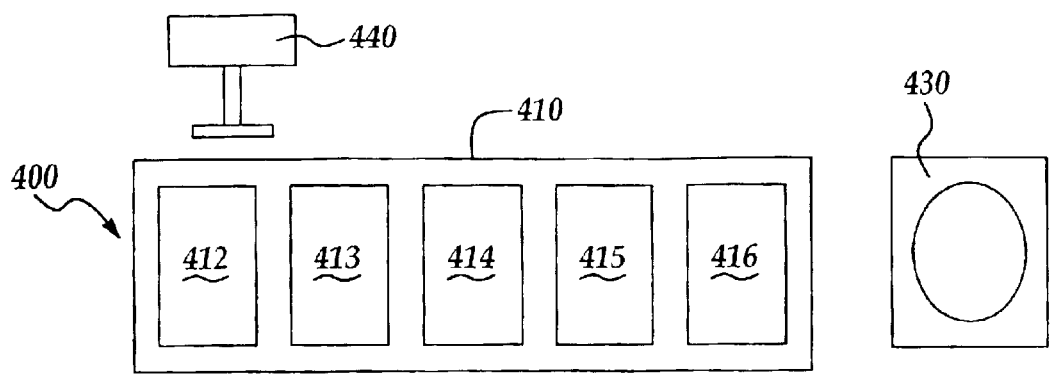
FIG. 4 is a schematic representation of an exemplary wafer cleaning apparatus for carrying out a pre-measurement cleaning process included in an embodiment of the present invention.

For example, referring to FIG. 4, an exemplary pre-measurement cleaning process includes using a conventional cleaning apparatus 400 including external housing 410, a plurality of cleaning stations e.g., 412 to 416, a spin drying station 430, and a robot transfer arm 440. Cleaning station 412, for example corresponds to a megasonic cleaning station, followed by cleaning stations 413, 414, 415, and 416 corresponding, for example, to first brushing, first rinsing, second brushing and second rinsing stations, respectively. Each of the cleaning stations 412 to 416 contains either a cleaning solution or rinsing solution, preferably deionized water, applied by a pressurized jet to the wafer surface during the brushing or scrubbing operation. In operation, the wafer is sequentially transferred, for example, through megasonic cleaning station 412, followed by the brushing (scrubbing) and rinsing stations 413 to 416, and finally to spin dry station 430 where the wafer is spun dried by spinning the wafer. It will appreciated that the cleaning process may include fewer or more steps as long as at least one of a spraying and scrubbing cleaning process is carried out, preferably a cleaning process including simultaneously spraying and scrubbing.

Figure 5:
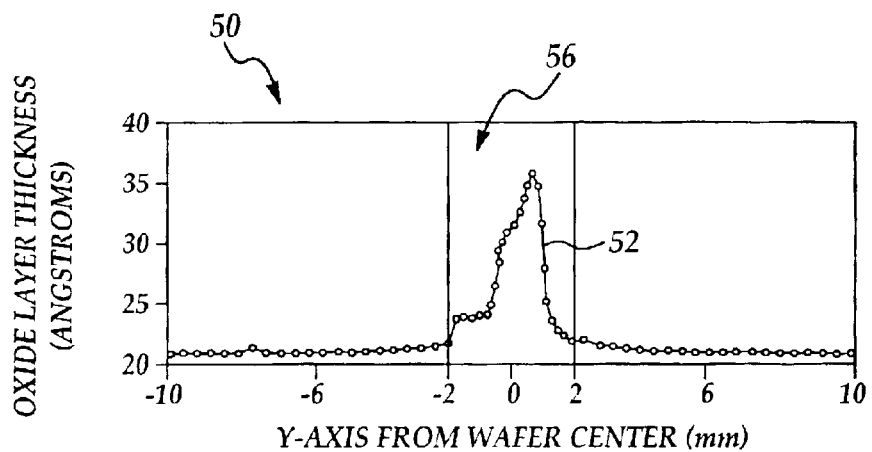
FIG. 5 is a graph of ellipsometer thickness measurements of a silicon dioxide layer calibration reference standard carried out over a diameter of the calibration reference standard showing and an exemplary excluded measurement area according to an embodiment of the present invention.

According to another aspect of the present invention, it was unexpectedly found that the calibration measurement process for measuring the wafer reference measurement standard is improved by carrying out the calibration measurement at a dielectric layer surface measurement area (spot measurement) displaced from the wafer center. Referring to FIG. 5 is shown a graph 50 of an exemplary series of sequential spot measurements along a y axis area (e.g., 24B in FIG. 2) of a wafer calibration reference standard having a silicon starting dioxide layer thickness of about 20 Angstroms and periodically (e.g., daily) subjected to the pre-measurement cleaning process according to one aspect of the present invention over a period of about 5 months. The vertical axis is the silicon dioxide layer thickness in Angstroms according to sequential Y axis area (e.g., 24B in FIG. 2) spot measurements while the horizontal axis is the relative location of the spot measurement (dielectric layer surface measurement area) displaced from the wafer center in millimeters. Line 52 represents spot measurements taken along the Y-axis area (e.g., 24B in FIG. 2). The measurements were, as in FIG. 2B, made with a Rudolph SL-200 ellipsometer with a spot size of about 7×12 microns with the calibration reference standard subjected to similar conditions including storing in a controlled ambient and a pre-measurement cleaning process according to one aspect of the present invention. It has been unexpectedly found that the change in thickness of the oxide layer, according to the prior art measurement protocol is limited to a central area 56 of the wafer reference standard over an area of about plus or minus 2 mm. It is believed the preferential oxide thickness variation at the wafer center is due to preferential accumulation of moisture at a central portion of the wafer leading to enhanced oxide growth, perhaps due to decreased centrifugal force at the central portion of the wafer during the spin drying procedure. A similar result was found for x-axis area (24B in FIG. 2) measurements. In contrast, spot measurements displaced from the wafer center (central portion) of the wafer reference standard by an amount greater than about 2 mm were found to have a substantially stable oxide dielectric layer thickness over time. Thus, according to an embodiment of the present invention a dielectric layer thickness measurement protocol including both a pre-measurement cleaning process and a measurement area displaced from the wafer center, for example, displaced at least greater than about 2 mm, preferably greater than about 3 mm, results in a substantially stable wafer reference standard giving repeatable measurements while avoiding dielectric layer growth due to contamination and/or oxide growth.

Figure 6:
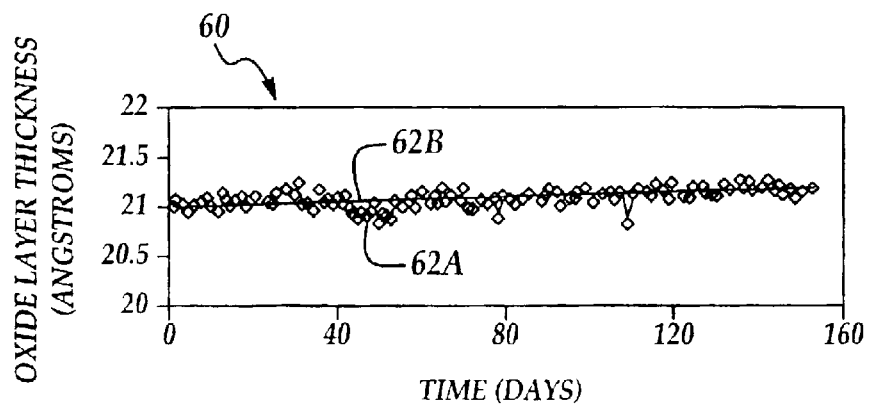
FIG. 6 is a graph of ellipsometer thickness measurements of a silicon dioxide layer calibration reference standard carried out with a preferred calibration measurement protocol according to an embodiment of the present invention.

For example, referring to FIG. 6 is shown is shown a graph 60 of an exemplary series of daily measurements over time of a calibration wafer reference standard having a starting silicon dioxide layer thickness of about 20 Angstroms. The vertical axis is the silicon dioxide layer thickness in Angstroms, while the horizontal axis is time between measurements in days. Line 62A together with regression line fit 62B represents sequential spot measurements (dielectric layer thickness measurement) taken at a measurement area displaced from the wafer center, for example, at least greater than about 2 mm, over a period of about 155 days where the dielectric layer thickness measurement was taken following the pre-measurement cleaning process according to one aspect of the invention. The calibration reference standard was additionally stored in a controlled ambient environment between measurements as previously outlined. The measurements, as in FIGS. 2, 3 and 5, were made with a Rudolph SL-200 ellipsometer with a spot size of about 7×12 microns. The results demonstrate that according to an embodiment of the present invention a dielectric layer thickness measurement protocol carried out on a wafer reference standard including both a pre-measurement cleaning process and an off-center (displaced from the wafer center) spot measurement area, displaced at least greater than about 2 mm, preferably greater than about 3 mm, from the wafer center, results in a substantially stable dielectric layer thickness reference standard giving repeatable measurements while avoiding dielectric layer growth by contamination and/or oxide growth.

Further, it has been found that the wafer reference standard measurement protocol of the present invention including a pre-measurement cleaning process and an off-wafer-center spot measurement can improve correlation of dielectric layer thickness measurements between different metrology tools, for example, including Ellipsometers with different beam spot sizes. For example, similar thickness measurement results were found using a Rudolph Ellipsometer Model S-200 having a significantly larger beam spot size measurement area of about 3×5 mm². In a preferred embodiment of the present invention, the measurement spot size is displaced from the wafer center such that the closest portion of the measurement beam to the wafer center is at least greater than about 2 mm, preferably greater than about 3 mm from the wafer center.

The preferred embodiments, aspects, and features of the invention having been described, it will be apparent to those skilled in the art that numerous variations, modifications, and substitutions may be made without departing from the spirit of the invention as disclosed and further claimed below.

What is claimed is:

1. A method for maintaining and measuring a dielectric layer thickness calibration reference standard to avoid the effects of oxidation and/or contamination comprising the steps of:
   providing a substrate comprising a dielectric layer for calibrating a dielectric layer thickness measurement;
   cleaning the dielectric layer according to a wet cleaning process comprising deionized water; and,
   measuring the thickness of the dielectric layer comprising a dielectric layer surface measurement area of the dielectric layer displaced from the substrate central portion.

2. The method of claim 1, wherein the substrate comprises a semiconductor wafer.

3. The method of claim 1, wherein the dielectric layer comprises an oxide having a thickness of less than about 30 Angstroms.

4. The method of claim 1, wherein the wet cleaning process is selected from the group consisting of spraying and scrubbing.

5. The method of claim 1, wherein the dielectric layer surface measurement area is displaced at least about 2 millimeters from the central portion.

6. The method of claim 1, wherein the steps of cleaning and measuring are periodically repeated.

7. The method of claim 1, wherein the substrate is stored between the steps of cleaning and measuring in a controlled ambient environment to avoid at least one of contamination and oxidation.

8. The method of claim 1, wherein the dielectric layer comprises silicon oxide.

9. The method of claim 1, wherein the wet cleaning process comprises spin drying the substrate.

10. The method of claim 1, wherein the step of measuring comprises probing the dielectric layer surface measurement area with a beam of light.

11. The method of claim 1, wherein the dielectric layer surface measurement area comprises at least one of the substrate x-axis and y-axis.

12. The method of claim 1, wherein the wet cleaning process comprises a megasonic cleaning process.

13. A method for maintaining and measuring a dielectric layer thickness wafer reference standard for improved metrology calibration comprising the steps of:
   providing a semiconductor wafer comprising a reference dielectric layer thickness for calibrating a dielectric layer thickness measurement;
   cleaning the dielectric layer according to a wet cleaning process selected from the group consisting of spraying, megasonic cleaning, and scrubbing; and,
   measuring the thickness of the dielectric layer at a reference thickness measurement area displaced greater than about 2 millimeters horizontally from the semiconductor wafer central portion.

14. The method of claim 13, wherein the dielectric layer comprises an oxide having a thickness of less than about 30 Angstroms.

15. The method of claim 13, wherein the wet cleaning process further comprises spin drying the semiconductor wafer.

16. The method of claim 13, wherein the step of measuring the thickness comprises probing the reference thickness measurement area with a beam of light.

17. The method of claim 13, wherein the steps of cleaning and measuring are periodically repeated.

18. The method of claim 13, wherein the semiconductor wafer is stored between the steps of cleaning and measuring in a controlled ambient environment controlling a condition selected from the group consisting of an organic chemical contamination level, a humidity level, and an oxygen containing gas level to avoid at least one of contamination and oxidation.

19. The method of claim 13, wherein the dielectric layer comprises silicon oxide.

20. The method of claim 13, wherein the reference thickness measurement area comprises at least one of the semiconductor wafer x-axis and y-axis.

* * * * *